United States Patent
He et al.

(10) Patent No.: US 12,536,468 B2
(45) Date of Patent: Jan. 27, 2026

(54) MODEL TRAINING METHOD, SHORT MESSAGE AUDITING MODEL TRAINING METHOD, SHORT MESSAGE AUDITING METHOD, ELECTRONIC DEVICE, AND STORAGE MEDIUM

(71) Applicant: Beijing Baidu Netcom Science and Technology Co., Ltd., Beijing (CN)

(72) Inventors: Huihui He, Beijing (CN); Leyi Wang, Beijing (CN); Minghao Liu, Beijing (CN); Jiangliang Guo, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 957 days.

(21) Appl. No.: 17/639,653

(22) PCT Filed: Apr. 12, 2021

(86) PCT No.: PCT/CN2021/086579
§ 371 (c)(1),
(2) Date: Mar. 2, 2022

(87) PCT Pub. No.: WO2022/077880
PCT Pub. Date: Apr. 21, 2022

(65) Prior Publication Data
US 2023/0351241 A1    Nov. 2, 2023

(30) Foreign Application Priority Data
Oct. 13, 2020   (CN) .......................... 202011093027.1

(51) Int. Cl.
*G06N 20/00* (2019.01)
*G06N 7/01* (2023.01)

(52) U.S. Cl.
CPC ............... *G06N 20/00* (2019.01); *G06N 7/01* (2023.01)

(58) Field of Classification Search
CPC .................................. G06N 20/00; G06N 7/01
(Continued)

(56) References Cited

U.S. PATENT DOCUMENTS

| | | | | |
|---|---|---|---|---|
| 2008/0270333 | A1* | 10/2008 | Jhala | G06Q 30/02 706/16 |
| 2009/0125461 | A1* | 5/2009 | Qi | G06N 20/10 706/12 |

(Continued)

FOREIGN PATENT DOCUMENTS

| | | |
|---|---|---|
| CN | 104809474 A | 7/2015 |
| CN | 107612893 A | 1/2018 |

(Continued)

OTHER PUBLICATIONS

X. Chen and T. Wang, "Combining Active Learning and Semi-Supervised Learning by Using Selective Label Spreading," 2017 IEEE International Conference on Data Mining Workshops (ICDMW), New Orleans, LA, USA, 2017, pp. 850-857, doi: 10.1109/ICDMW.2017.154. (Year: 2017).*

J.-D. Chen and H.-Y. Kao, "LDA based semi-supervised learning from streaming short text," 2015 IEEE International Conference on Data Science and Advanced Analytics (DSAA), Paris, France, 2015, pp. 1-8, doi: 10.1109/DSAA.2015.7344830. (Year: 2015).*

(Continued)

*Primary Examiner* — Kieu D Vu
*Assistant Examiner* — Nicholas Hasty
(74) *Attorney, Agent, or Firm* — Husch Blackwell LLP

(57) ABSTRACT

The present application discloses a model training method, a short message auditing method and apparatuses, a device, and a storage medium, and relates to the field of artificial intelligence. A specific implementation solution of model training is: performing a sample reduction on first unlabeled samples to obtain second unlabeled samples; inputting the second unlabeled samples to a machine learning model for (Continued)

prediction, to obtain a probability corresponding to a result of predicting the second unlabeled samples; selecting a third unlabeled sample from the second unlabeled samples according to the probability; and training the machine learning model by using a third unlabeled sample after labeling. In embodiments of the present application, redundant samples are removed through a sample reduction, such that the selected samples have a certain degree of representativeness. In addition, a machine learning model is used to further select an informative sample with the most labeling significance for the current model by using an active learning technology, the cost of labeling is reduced.

17 Claims, 8 Drawing Sheets

(58) Field of Classification Search
USPC .......................................................... 706/12
See application file for complete search history.

(56) References Cited

U.S. PATENT DOCUMENTS

| 2018/0260735 A1 | 9/2018 | Arad et al. |
| 2021/0056417 A1* | 2/2021 | Zhang .................... G06N 20/00 |

FOREIGN PATENT DOCUMENTS

| CN | 109492026 A | 3/2019 |
| CN | 110457675 A | 11/2019 |
| CN | 111291755 A | 6/2020 |
| CN | 111753086 A | 10/2020 |
| CN | 112085219 A | 12/2020 |

OTHER PUBLICATIONS

Yang Murong et al.: "Dimension reduction based on small sample entropy learning for hand-writing image", Multimedia Tools and Applications, Kluwer Academic Publishers, Boston, US, vol. 80, No. 11, Jun. 14, 2020 (Jun. 14, 2020), pp. 17365-17376, XP037458761, ISSN: 1380-7501, DOI: 10.1007/S11042-020-09019-W.

* cited by examiner

MODEL TRAINING METHOD, SHORT MESSAGE AUDITING MODEL TRAINING METHOD, SHORT MESSAGE AUDITING METHOD, ELECTRONIC DEVICE, AND STORAGE MEDIUM

The present application claims priority to PCT Application No. PCT/CN2021/086579, filed Apr. 12, 2021, which itself claims priority to Chinese Patent Application No. 202011093027.1, filed with the China National Intellectual Property Administration on Oct. 13, 2020, and entitled "MODEL TRAINING METHOD, SHORT MESSAGE AUDITING METHOD AND APPARATUSES, DEVICE, AND STORAGE MEDIUM," both of which are incorporated herein by reference in their entireties.

TECHNICAL FIELD

The present application relates to the field of computer technology, and in particular, to the field of artificial intelligence.

BACKGROUND

Model training requires a large amount of manually labeled data. In addition, with the continuous development of services, it is necessary to constantly supplement the latest labeled data, so that a model is iterated and optimized with the services.

SUMMARY

The present application provides a model training method, a short message auditing method and apparatuses, a device, and a storage medium.

According to a first aspect of the present application, it is provided a model training method, including:
  performing a sample reduction on first unlabeled samples to obtain second unlabeled samples;
  inputting the second unlabeled samples to a machine learning model for prediction, to obtain a probability corresponding to a result of predicting the second unlabeled samples;
  selecting a third unlabeled sample from the second unlabeled samples according to the probability; and
  training the machine learning model by using a third unlabeled sample after labeling.

According to a second aspect of the present application, it is provided a short message auditing model training method, including:
  obtaining a short message auditing model by using the model training method in the above embodiment.

According to a third aspect of the present application, it is provided a short message auditing method, including:
  acquiring text information of a short message to be audited;
  performing, by using a keyword, a preliminary audit on the text information of the short message to be audited; and
  inputting text information of a short message to be audited that passes the preliminary audit to a short message auditing model for prediction, to obtain a result of auditing the text information of the short messages to be audited; the short message auditing model being a model obtained by using the short message auditing model training method in the above embodiment.

According to a fourth aspect of the present application, it is provided an electronic device, including:
  at least one processor; and
  a memory communicatively connected to the at least one processor, wherein
  the memory stores instructions that can be executed by the at least one processor, and the instructions are executed by the at least one processor to enable the at least one processor to execute the method provided by any one embodiment of the present application.

According to fifth aspect of the present application, a non-transitory computer-readable storage medium storing computer instructions is provided, the computer instructions being used to cause the computer to perform the method provided by any one embodiment of the present application.

It should be understood that the content described in this section is not intended to identify the key or important features of the embodiments of the present application, and is not intended to limit the scope of the present application. Other features of the present application will be easily understood through the following description.

BRIEF DESCRIPTION OF THE DRAWINGS

The accompanying drawings are used to better understand the present solution(s) and do not construct a limitation to the present application. In the drawings.

DETAILED DESCRIPTION

The exemplary embodiments of the present application will be described below in combination with the accompanying drawings, including various details of the embodiments of the present application to facilitate understanding, which should be considered as exemplary only. Therefore, those skilled in the art should realize that various changes and modifications can be made to the embodiments described herein without departing from the scope and spirit of the present application. Likewise, descriptions of wellknown functions and structures are omitted in the following description for clarity and conciseness.

Figure 1:
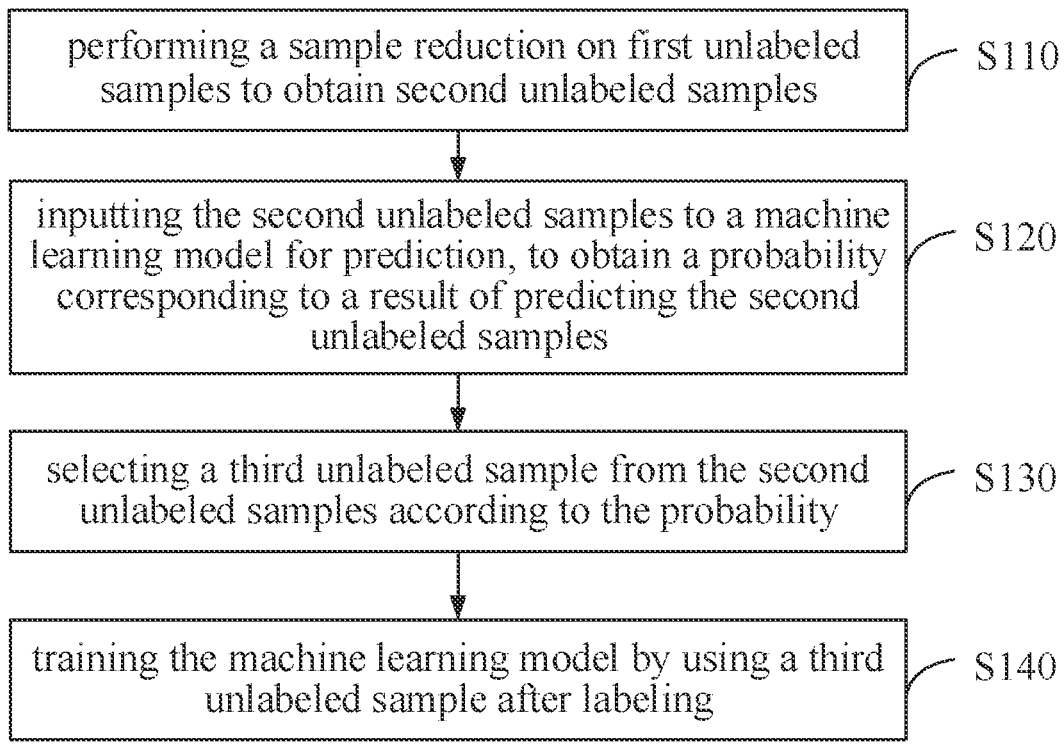
FIG. 1 is a flowchart of a model training method according to an embodiment of the present application.

FIG. 1 is a flowchart of a model training method according to an embodiment of the present application. Referring to FIG. 1, the model training method includes:

S110, performing a sample reduction on first unlabeled samples to obtain second unlabeled samples;

S120, inputting the second unlabeled samples to a machine learning model for prediction, to obtain a probability corresponding to a result of predicting the second unlabeled samples;

S130, selecting a third unlabeled sample from the second unlabeled samples according to the probability; and S140, training the machine learning model by using a third unlabeled sample after labeling.

In the existing technology, a newly added labeled sample used for model iteration and a labeled sample that has been learned by a model may contain the same knowledge. In other words, the newly added labeled sample may not provide newly added amount of information, and cannot significantly contribute to improving the performance of the model.

The embodiment of the present application provides a model training method, in which through a sample reduction, the selected samples have a certain degree of representativeness, and an informative sample is further selected on the basis of an active learning technology. The active learning can include selecting an unmarked sample by a model in a learning process, and requesting the outside to provide marking information. An objective of the active learning can include achieving good learning performance with as few queries as possible.

In a model training process, unlabeled short messages are first captured from logs of a short message production system or from a short message consulting group. In S110, a sample reduction is performed on captured first unlabeled samples. A deduplication process is performed on the first unlabeled samples through the sample reduction, to obtain second unlabeled samples having a certain degree of representativeness.

In S120, the second unlabeled samples are input to a machine learning model for prediction on the basis of the active learning technology. Where the machine learning model can perform classification prediction on the labeled samples. Taking a machine learning model used for a short message as an example, the second unlabeled samples are input to the machine learning model for prediction, and a result indicating whether the short message passes an audit and a probability corresponding to the result of predicting can be output.

In S130, the probability obtained in S120 is substituted into a formula for a preset selection strategy for calculation, to obtain a third unlabeled sample selected from the second unlabeled samples.

In S140, the third unlabeled sample selected in S130 is labeled, and then the machine learning model is trained by using a third unlabeled sample after labeling.

In this embodiment of the present application, through a sample reduction, the selected samples have a certain degree of representativeness, and a machine learning model is used to further select an informative sample with the most labeling significance for the current model by using an active learning technology, the cost of labeling is reduced. Taking a machine learning model for a short message as an example, each of operations, from reduction, prediction, selection to labeling, of short message data is organically linked together, and thus the iteration and optimization are performed, achieving a closed loop of the short message data. The selected sample is labeled in a subsequent operation, and the labeled sample is used to train a short message auditing model, achieving automatic iteration of the short message auditing model, and thereby more effectively improving the prediction performance of the model.

Figure 2:
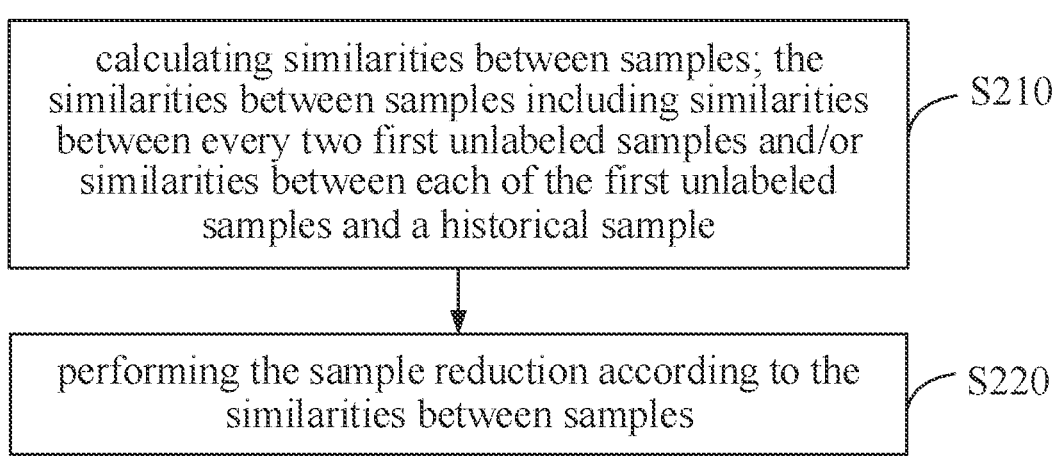
FIG. 2 is a flowchart of a sample reduction in a model training method according to an embodiment of the present application.

FIG. 2 is a flowchart of the sample reduction in the model training method according to an embodiment of the present application. As shown in FIG. 2, in an implementation, S110 in FIG. 1 of performing a sample reduction on first unlabeled samples to obtain second unlabeled samples includes:

S210, calculating similarities between samples; the similarities between samples including similarities between every two first unlabeled samples and/or similarities between each of the first unlabeled samples and a historical sample; and S220, performing the sample reduction according to the similarities between samples.

Before the calculation of the similarities between the first unlabeled samples, the first unlabeled samples can be preprocessed. For example, numbers in the first unlabeled samples are uniformly replaced with "${number}," and phone numbers in the first unlabeled samples are uniformly replaced with "${phone number}."

In order to improve the speed of the similarity calculation, a similarity issue can be converted into a set issue, and the similarity calculation is performed by using the intersection and union between samples. Taking a short message sample as an example, text information of the short message sample can be considered as a character set. A similarity and a distance between two samples can be calculated by using the following formulas:

$$s = \frac{common\_len}{total\_len}, \text{and} \qquad \text{Formula 1}$$

$$d = 1 - \frac{common\_len}{total\_len}; \qquad \text{Formula 2}$$

where S denotes a similarity between two samples, common_len denotes the intersection of characters contained in the two samples, total_len denotes the union of the characters contained in the two samples, and d denotes a distance between the two samples.

In an implementation, during the similarity calculation, a result of the similarity calculation can also be cached, to avoid repeated calculation. The use of a caching mechanism can improve calculation efficiency, and thereby improve overall operating efficiency of a system.

In addition to the above method in which the text information of the sample is considered as the character set, other similarity strategies can also be used. For example, it is common that a sentence is represented by using a vector, and an inner product or cosine similarity is used to obtain a value of the similarity of two sentences.

Taking a short message sample as an example, data A represents a batch of current newly captured short message samples, and data B represents historical samples in a database. Where the historical samples include labeled samples and unlabeled samples. The data B may have a relatively large amount of data, and therefore, the data B is sliced into b1, b2, b3, b4 . . . . In case of the calculation of similarities between the data A and the data B, similarities between A and b1, similarities between A and b2, similarities between A and b3, . . . , are calculated, to remove sentences with excessive similarity in the data A. After the above processing, the remaining data A is stored in the database.

In this embodiment of the present application, the sample reduction is performed through the similarity calculation, so that the selected samples have a certain degree of representativeness, improving the labeling significance of the sample.

In an implementation, selecting the third unlabeled sample from the second unlabeled samples according to the probability includes:

performing calculation by using a preset selection strategy to obtain the third unlabeled sample; the selection strategy including at least one of a maximum entropy strategy, a minimum confidence strategy, a minimum interval strategy, or a classifier voting strategy.

After the model outputs the result of predicting the second unlabeled samples, the probability corresponding to the result of predicting the second unlabeled samples can be substituted into formulas for selection strategies for calculation, and an informative sample with the most labeling significance for the current model is selected through the calculation.

The above formulas for the selection strategies are as follows:

Formula A: a formula for the maximum entropy strategy:

$$x_H^* = \mathrm{argmax}_x - \Sigma_i P_\theta(y_i|x) \log(y_i|x);$$

Formula B: a formula for the minimum confidence strategy:

$$x_{LC}^* = \underset{x}{\mathrm{argmax}}\, 1 - P_\theta(\hat{y}|x);$$

Formula C: a formula for the minimum interval strategy:

$$x_M^* = \underset{x}{\mathrm{argmin}} P_\theta(\hat{y}_1|x) - P_\theta(\hat{y}_2|x);$$

Formula D: a formula for the classifier voting strategy:

$$x_{VE}^* = \underset{x}{\mathrm{argmax}} - \sum_i \frac{V(y_i)}{C} \log \frac{V(y_i)}{C}.$$

In the above formulas, x denotes input samples; P denotes a probability predicted by the model, $P_\theta$ denotes a predicted probability output by the model, and $P_\theta(y_i|x)$ denotes a predicted probability for a prediction classification $y_i$ in case that the input samples are x; $y_i$ denotes a classification, and $y_i$ indicates passing the audit or not passing the audit, C denotes the number of classifiers, and $V(y_i)$ denotes the number of classifiers that vote for the classification $y_i$; $x_H^*$ denotes a sample selected by the maximum entropy strategy; $x_{LC}^*$ denotes a sample selected by the maximum confidence strategy; $x_M^*$ denotes a sample selected by the minimum interval strategy; and $x_{VE}^*$ denotes a sample selected by the classifier voting strategy.

In the above formulas, argmax is a function for solving a parameter of a function. In case that there is another function y=f(x), if there is a result x0=argmax (f(x)), it means that in case of x=x0 for the function f(x), a maximum value in the value range of f(x) is obtained. Similarly, argmin is also a function for solving a parameter of a function. When there is another function y=f(x), if there is a result x0=argmmin (f(x)), it means that in case of x=x0 for the function f(x), f(x) outputs a minimum value in the value range of f(x) is obtained. In other words, arg max f(x) is the value of x in case of f(x) taking the maximum value; and arg min f(x) is the value of x in case of f(x) taking the minimum value.

Through the above selection strategies, a sample that is difficult for the model to recognize can be selected. The sample that is difficult to recognize contain knowledge that the model does not learned. Therefore, an informative sample with the most labeling significance for the current model can be selected through the above selection strategies.

In this embodiment of the present application, an informative sample with the most labeling significance for the current model is further selected by using a selection strategy, the labeling significance of the sample is increased and the cost of labeling is reduced. And then, in the subsequent process, the short message auditing model is trained by using a labeled sample, so that the prediction performance of the model can be improved more effectively.

Figure 3:
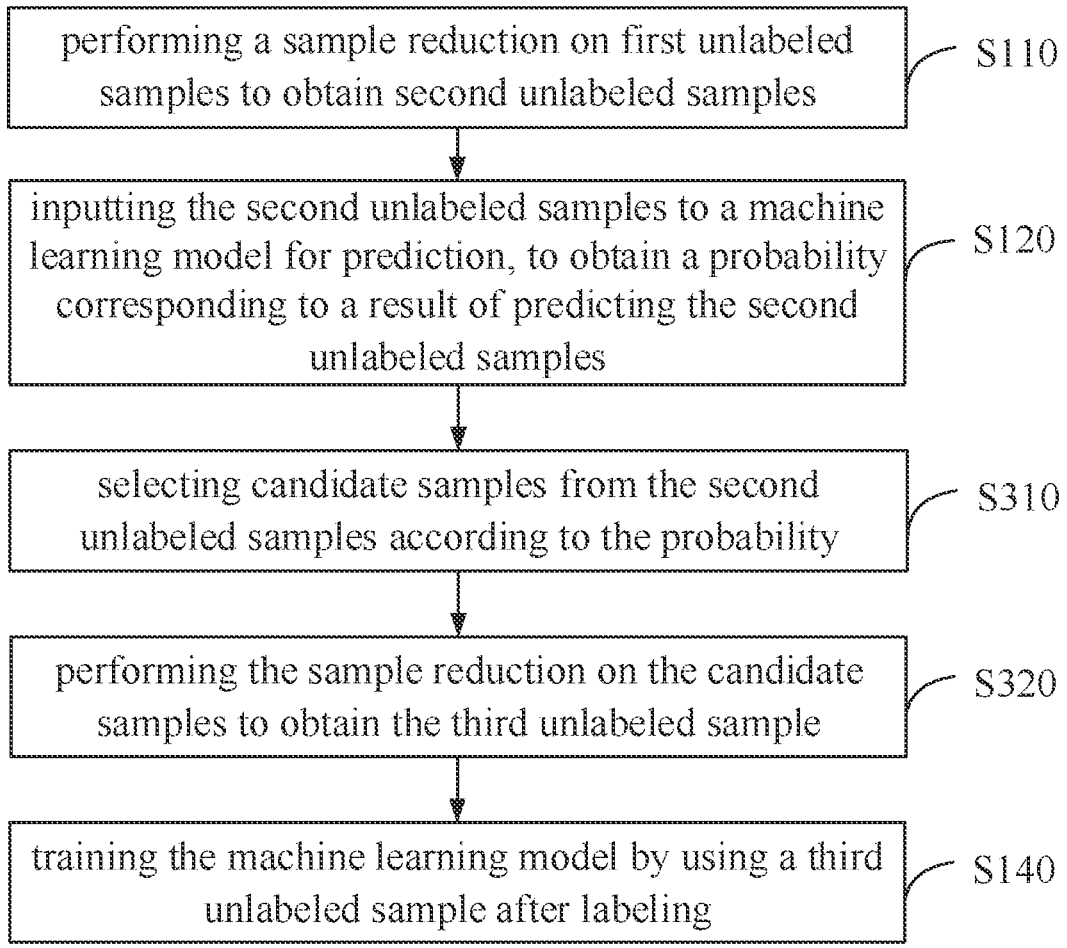
FIG. 3 is a flowchart of a sample reduction in a model training method according to another embodiment of the present application.

FIG. 3 is a flowchart of the sample reduction in the model training method according to another embodiment of the present application. As shown in FIG. 3, in an implementation, S130 in FIG. 1 of selecting the third unlabeled sample from the second unlabeled samples according to the probability further includes:

S310, selecting candidate samples from the second unlabeled samples according to the probability; and S320, performing the sample reduction on the candidate samples to obtain the third unlabeled sample.

In the foregoing S110, a first sample reduction is performed on the captured first unlabeled samples. A deduplication process is performed on the first unlabeled samples through the first sample reduction, to obtain the second unlabeled samples having a certain degree of representativeness.

In S120, the second unlabeled samples are input to the machine learning model for prediction on the basis of the active learning technology, to output a probability corresponding to a result of predicting. In S310, candidate samples are selected from the second unlabeled samples according to the probability. 310 can specifically include: performing calculation by using a preset selection strategy to obtain the candidate samples, the selection strategy including at least one of a maximum entropy strategy, a minimum confidence strategy, a minimum interval strategy, or a classifier voting strategy. After the model outputs a result of predicting the second unlabeled samples, a probability corresponding to the result of predicting the second unlabeled samples can be substituted into formulas for selection strategies for calculation, and informative candidate samples with the most labeling significance for the current model are selected through calculation. The above formulas for the selection strategies can be referred to the related description of Formula A to Formula D, and will not be described in detail herein.

In S320, a second sample reduction is performed on the candidate samples, and a deduplication process is performed on the candidate samples through the second sample reduction, to obtain a third unlabeled sample having more representativeness.

In an example, the second sample reduction can be performed through similarity calculation. The method of similarity calculation can be referred to the related description of the foregoing S210 and S220, and will not be described in detail herein. Likewise, other similarity strategies can also be used for the second sample reduction. For example, it is common that a sentence is represented by using a vector, and an inner product or cosine similarity is used to obtain a value of the similarity of two sentences.

After the active learning, a deduplication process can be performed again through the second sample reduction, so that the obtained third unlabeled sample has more representativeness, further increasing the labeling significance of the sample.

In an implementation, a manner of labeling the third unlabeled sample includes: offline labeling and/or online labeling.

Figure 4:
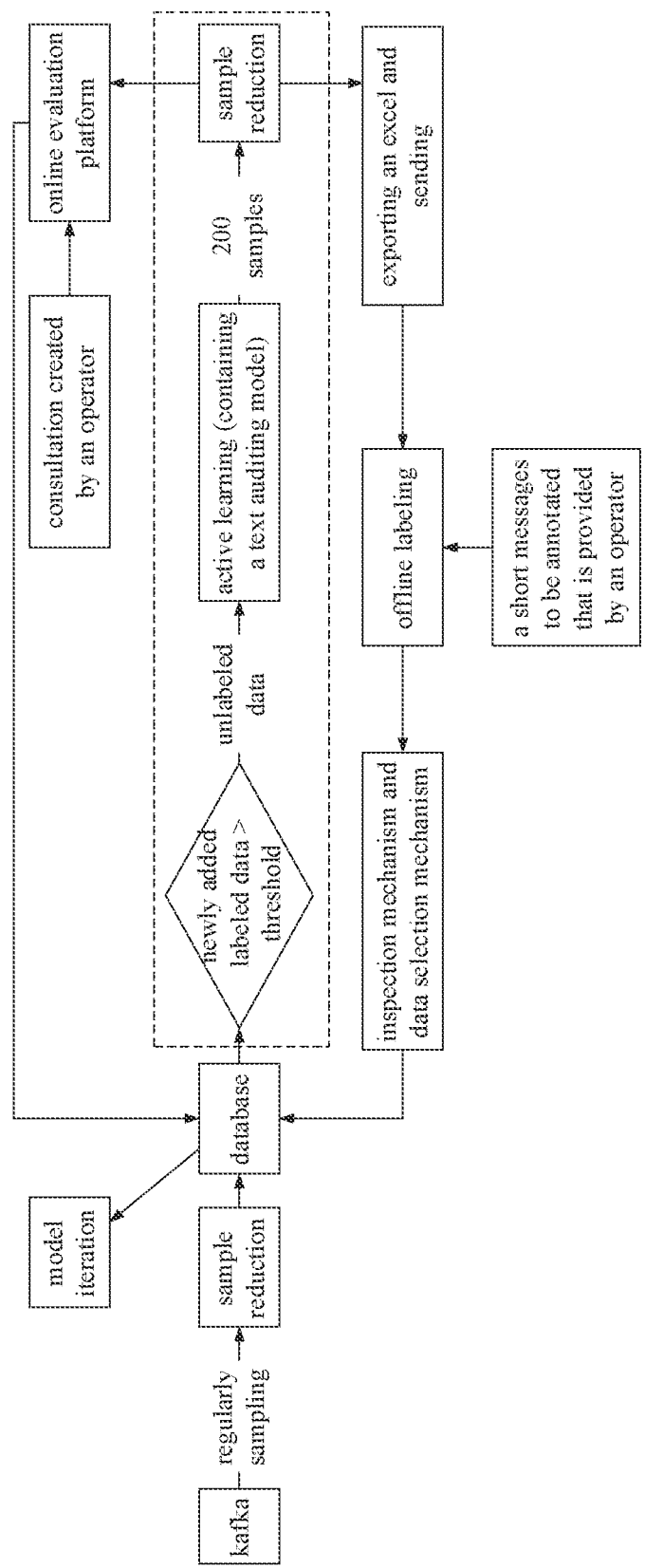
FIG. 4 is a flowchart of a model training method according to another embodiment of the present application.

FIG. 4 is a flowchart of a model training method according to another embodiment of the present application. Taking a short message auditing model as an example, a data flow process for online automatically iterating a model is shown in FIG. 4:

1) Data is sampled regularly from a short message production system every day. For example, the data can be sampled regularly from the short message production system by using a distributed message system Kafka. After performing the first sample reduction, the data is stored in an unlabeled sample table of a database. In the unlabeled sample table, an attribute of each newly added short message is set to unselected.

2) It is determined whether the number of the currently newly added labeled samples is greater than a threshold, compared with the previous time when the active learning model is started to select unlabeled samples. If the number of the currently newly added labeled samples is greater than the threshold, the method proceeds to (3) to start a new round of operation of selecting unlabeled data. If the number of the currently newly added labeled samples is less than the threshold, the method continues to wait.

In this operation, if there is too little newly added labeled data, even if a new round of active learning is started to select unlabeled samples, data quality of the selected unlabeled samples may be the same as that of unlabeled samples selected in the previous round. In other words, the unlabeled samples selected in the new round and the unlabeled samples selected in the previous round may contain similar knowledge. This is a situation of wasting labeling resources. The occurrence of this situation of wasting labeling resources should be avoided as much as possible.

3) All unlabeled and unselected samples in the database are sent to a short message auditing model. Samples to be labeled are selected on the basis of the short message auditing model and active learning strategy, and then the second sample reduction is performed on the selected samples to be labeled. Considering the labeling efficiency of labeling personnel, several hundred unlabeled samples can be selected every day. For example, 200 unlabeled samples can be selected every day.

4) For the selected samples to be labeled, at least one of the following different manners of labeling can be used: offline labeling or online labeling.

In an example, the manner of offline labeling can include: exporting the selected third unlabeled sample to an excel (spreadsheet), and automatically sending an email to relevant labeling personnel for labeling. After the relevant labeling personnel processing, an inspection mechanism and a data selection mechanism can be set for labeling information, in the excel, that has been labeled. The inspection mechanism is mainly used to check whether all relevant fields in a labeled sample have been labeled. The data selection mechanism can be used to introduce predefined data selection rules related to a service. Through the design of the data selection mechanism, knowledge in the service field can be introduced, so that the selected labeled sample can meet service requirements. Taking a short message auditing service as an example, the following several selection rules can be set:

(a) selecting samples that pass a manual audit and are not highly complained as positive samples;

(b) selecting samples that are not allowed by policies as negative samples; and (c) selecting samples that are not blacklisted, are allowed by the policies, and do not pass the manual audit as negative samples.

In another example, the manner of online labeling can include: automatically sending the selected third unlabeled sample to an online evaluation platform. In one aspect, a data source of the online evaluation platform can be unlabeled samples selected from logs of the short message production system on the basis of active learning, or can also be unlabeled samples captured from a short message consulting group created by an operator. An advantage of the manner of online labeling lies in automatically obtaining the labeled data and iterating the short message auditing model, which avoids the need to manually copy the labeling information, in the excel, that has been labeled to a specified directory in the manner of offline labeling.

The labeled sample can be stored into the database as a training sample for the short message auditing model to complete the automatic iteration of the model.

In this embodiment of the present application, through the two manners of online labeling and offline labeling, the effect of automatically iterating the short message auditing model at the minimum cost of labeling with the development of services is achieved. In addition, the quality of labeling can be ensured through the inspection mechanism, and priori knowledge in related service fields can be introduced through the data selection mechanism, achieving a closed loop of service data and the automatic iteration of the machine learning model.

In an implementation, the foregoing method further includes:

training the machine learning model by using a cross-entropy loss function and a focal loss function.

Cross entropy can be used as a loss function in machine learning. In an example, p can denote the distribution of actual marks, q can be the distribution of predicted marks of a trained model, and the cross-entropy loss function can measure a similarity between p and q.

The focal loss function (Focal Loss) can solve the issues of imbalance in classifications of samples and imbalance in difficulties for classifying samples, etc. In an example, the Focal Loss alleviates the above issues and improves the accuracy of predicting by the model by modifying the cross-entropy function and by increasing factors of classification weights and of sample difficulty weights.

In this embodiment of the present application, the focal loss function is added in the cross-entropy loss function, which improves the accuracy of predicting by the model.

According to another aspect of an embodiment of the present application, a short message auditing model training method is provided, including: obtaining a short message auditing model by using any one model training method in the foregoing embodiments. Specifically, a machine learning model obtained by using any one model training method in the foregoing embodiments is the short message auditing model.

Figure 5:
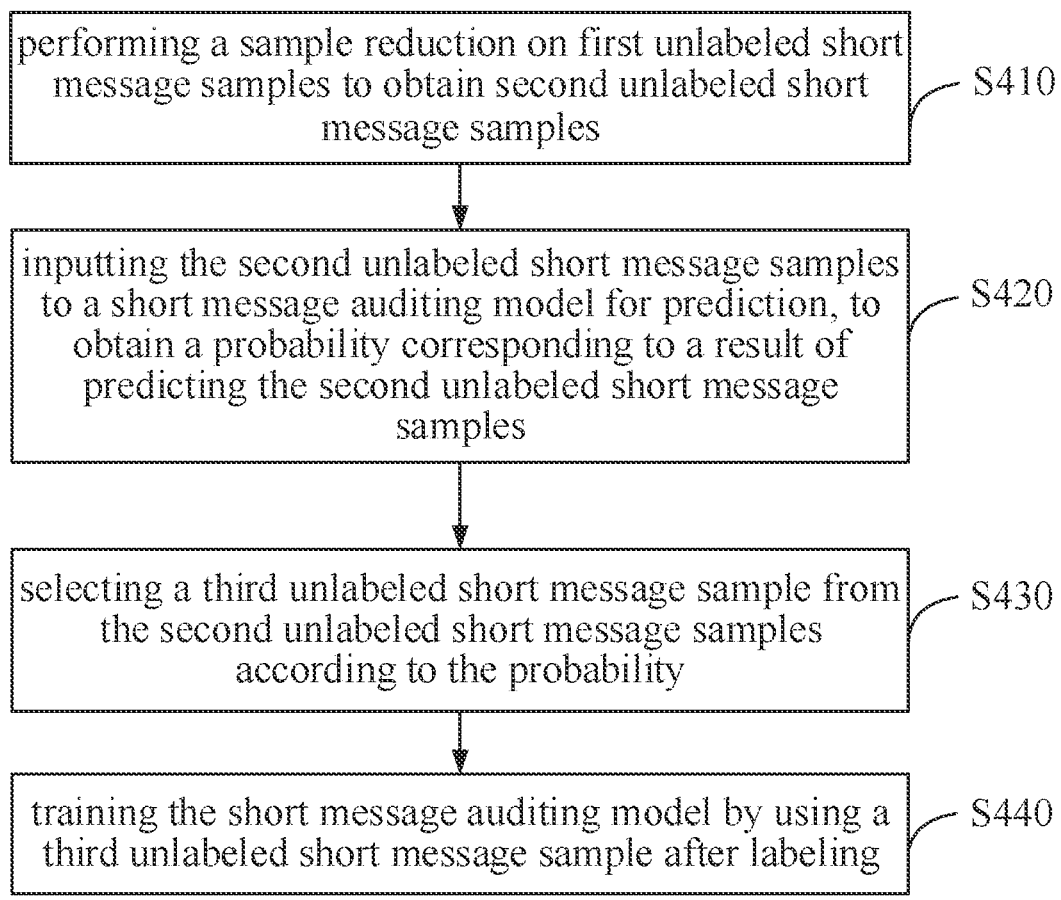
FIG. 5 is a flowchart of a short message auditing model training method according to an embodiment of the present application.

FIG. 5 is a flowchart of a short message auditing model training method according to an embodiment of the present application. Taking short message samples as an example, first unlabeled samples are first unlabeled short message samples, and second unlabeled samples are second unlabeled short message samples. As shown in FIG. 5, the short message auditing model training method includes:

S410, performing a sample reduction on first unlabeled short message samples to obtain second unlabeled short message samples;

S420, inputting the second unlabeled short message samples to a short message auditing model for prediction, to obtain a probability corresponding to a result of predicting the second unlabeled short message samples, S430, selecting a third unlabeled short message sample from the second unlabeled short message samples according to the probability; and S440, training the short message auditing model by using a third unlabeled short message sample after labeling.

The short message auditing model training method in this embodiment of the present application is similar to the principle of the above model training algorithm, which can be referred to the related description of the above model training method, and will not be described in detail herein.

Figure 6:
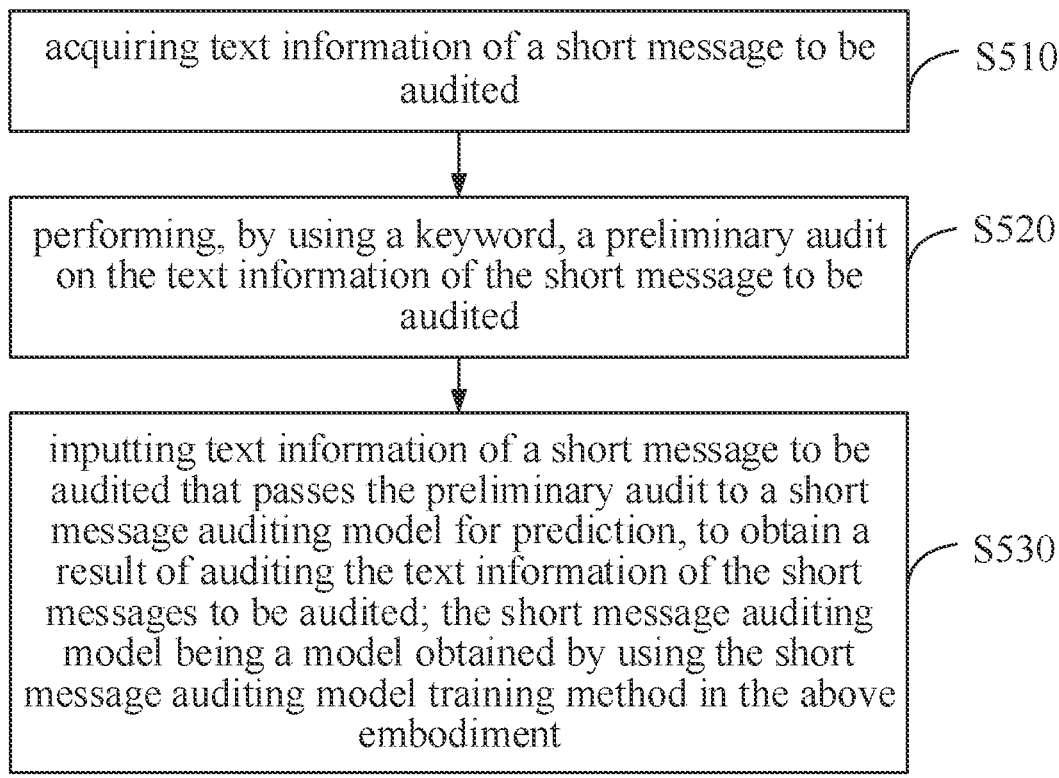
FIG. 6 is a flowchart of a short message auditing method according to an embodiment of the present application.

FIG. 6 is a flowchart of a short message auditing method according to an embodiment of the present application. As shown in FIG. 6, the short message auditing method includes:

S510, acquiring text information of a short message to be audited;

S520, performing, by using a keyword, a preliminary audit on the text information of the short message to be audited; and S530, inputting text information of a short message to be audited that passes the preliminary audit to a short message auditing model for prediction, to obtain a result of auditing the text information of the short messages to be audited; the short message auditing model being a model obtained by using the short message auditing model training method in the above embodiment.

In the above embodiment, a sample that is difficult to be recognized is actively selected through the model on the basis of the active learning technology, and is provided for manual labeling, so that the short message auditing model is automatically iterated at relatively low cost of labeling. In addition, before and after active learning, by front-setting the sample reduction technology and back-setting the sample reduction technology, labeling the most valuable data is further achieved.

On this basis, an embodiment of the present application further provides a short message auditing method that can effectively reduce the cost of labeling and quickly improve the performance of a model. This method is applicable to all scenarios in which the prediction performance of the model needs to be improved by adding labeled data and automatically iterating a machine learning model.

In the existing technology, for a short message auditing method based on a keyword and a manual audit, with the continuous development of services, it is necessary to manually summarize and supplement a keyword library, and the workload is large. In addition, a keyword matching method only utilizes superficial features of vocabulary, and does not fully explore word meaning relationship and semantic relationship, which brings great limitations.

The method for performing short message auditing by using a machine learning model requires a large amount of manually labeled data. In addition, with the continuous development of services, it is necessary to constantly supplement the latest labeled data, so that a model is iterated and optimized with the services. However, the short message service generates a huge number of short message logs every day, and if sample to be labeled are randomly selected from these short message logs, the newly added labeled samples may not provide newly added amount of information, and can not necessarily improve the model after consuming a certain cost of labeling.

With regard to the above issue, an embodiment of the present application provides a short message auditing method based on active learning. Wherein, the short message auditing method uses a two-step strategy: first, auditing text of a short message through a keyword library, and then further auditing a sample that pass the audit by a machine learning model. With regard to the issue of continuous iteration and optimization of the short message auditing model, an unlabeled sample selection strategy based on active learning is used, and the front-setting and/or back-setting sample reduction strategy is used, so that the short message auditing model is automatically iterated at the minimum cost of labeling with the development of services.

An exemplary short message auditing system for implementing the short message auditing method of the present application can include several modules such as a short message capturing, a sample reduction, an active learning strategy, and a text auditing model.

(1) Short Message Capturing

One data source for unlabeled short message samples is to regularly sample unlabeled data from logs of a short message production system and store them in a database. In an example, a time range of the short message logs acquired in the current time period is from 12 o'clock last night to 12 o'clock tonight.

Another data source for the unlabeled short message samples is unlabeled short messages consulted in a short message consulting group. It is necessary to screen out short messages with labeling significance from the short messages acquired from the production system by the active learning, thereby reducing the cost of labeling. The unlabeled short messages in the short message consulting group are short messages that cannot be recognized manually, and these short messages usually have relatively high information value, and therefore can be captured directly.

(2) Sample Reduction

For this batch of unlabeled short message data acquired regularly from the short message production system every day, the following sample reduction strategies can be used: short message sample reduction within the batch (batch reduce), and performing a reduction on historical short message data in an unlabeled data table (history reduce). Due to a large amount of historical short message data, a paging query operation can be used to calculate a similarity with a part of historical data each time. Finally, the latest batch of short messages after the sample reduction operation is stored into the database. The specific implementation of the sample reduction can be referred to the related description of the foregoing embodiments in FIG. 1 to FIG. 4, and will not be described in detail herein.

(3) Active Learning

The active learning includes: the model actively selects an informative unlabeled sample and provides the same to an expert for labeling, so that in case that the training set is small, a higher classification accuracy rate can be obtained. In the short message auditing method and system in this embodiment of the present application, a valuable sample is selected according to the amount of information of the samples themself and the representativeness of the samples. Before the unlabeled samples are selected and after the unlabeled samples are selected through active learning, a sample reduction operation is set respectively, so that selected samples have a certain degree of representativeness. For the amount of information of the samples themself, a plurality of selection strategies such as the maximum entropy strategy, the minimum confidence strategy, the minimum interval strategy, and the classifier voting strategy can be used to select an informative sample. The specific implementation of the above selection strategies can be referred to the related description of the foregoing embodiments in FIG. 1 to FIG. 4, and will not be repeatedly described herein.

(4) Text Auditing

First, a short message to be audited is input, and a preliminary audit is performed on the short message by using a rule method based on a keyword library and regex matching. This method is also referred to as a shielding word strategy. The keyword library can be provided by an operator. In addition, the operator will also provide regular expressions accumulated through experience. For example, these regular expressions are: (?: Exclusive|Hottest|Breaking News), (?: Buy|Subscribe|Identification Chip|Donate), (?: Two Bedrooms|Housing|Elite House|Villa), and (?: Discount|Limited Time|Special Sales), etc.

The samples that pass the preliminary audit are further audited through the short message auditing model. Wherein, the short message auditing model includes, but is not limited to, logistic regression, TextCNN, or Transformer. Where TextCNN is an algorithm of classifying text by using a CNN (Convolutional Neural Networks). Transformer refers to a Transformer block (block), which consists of a self-attention mechanism model and a forward neural network. Transformer is similar to the CNN in that it is also a method for obtaining a text representation.

In addition, the short message auditing scenario belongs to an unbalanced sample classification scenario, and negative samples that do not pass the audit are usually far more than positive samples that pass the audit. Therefore, a focal loss can be used in a loss function, the loss function having a better effect on dealing with the imbalance of positive and negative samples and the imbalance of difficult and easy samples.

Figure 7:
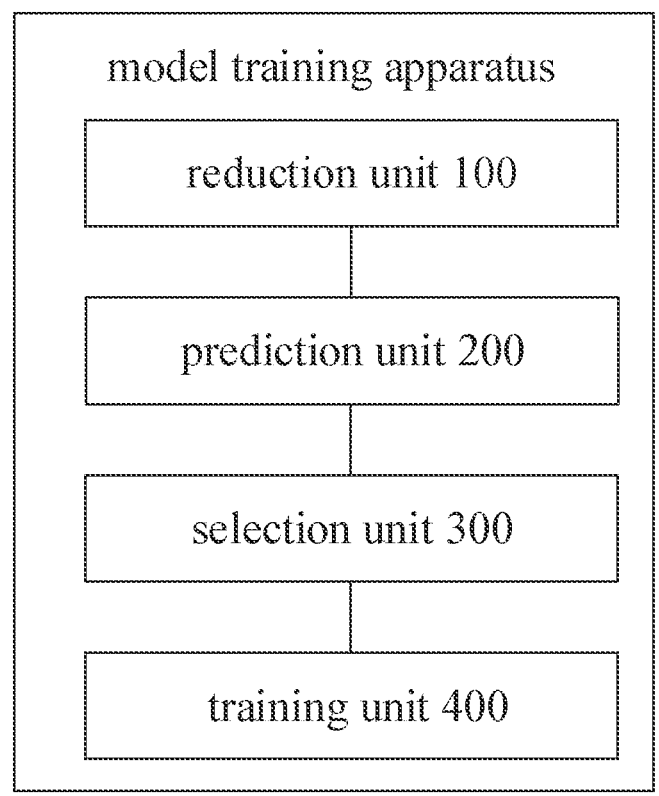
FIG. 7 is a schematic diagram of a model training apparatus according to an embodiment of the present application.

FIG. 7 is a schematic diagram of a model training apparatus according to an embodiment of the present application. Referring to FIG. 7, the model training apparatus includes:
  a reduction unit 100 configured for performing a sample reduction on first unlabeled samples to obtain second unlabeled samples;
  a prediction unit 200 configured for inputting the second unlabeled samples to a machine learning model for prediction, to obtain a probability corresponding to a result of predicting the second unlabeled samples,
  a selection unit 300 configured for selecting a third unlabeled sample from the second unlabeled samples according to the probability; and
  a training unit 400 configured for training the machine learning model by using a third unlabeled sample after labeling.

In an implementation, the reduction unit 100 is configured for:
  calculating similarities between samples; the similarities between samples including similarities between every two first unlabeled samples and/or similarities between each of the first unlabeled samples and a historical sample; and
  performing the sample reduction according to the similarities between samples.

In an implementation, the selection unit 300 is further configured for:
  performing calculation by using a preset selection strategy to obtain the third unlabeled sample; the selection strategy including at least one of a maximum entropy strategy, a minimum confidence strategy, a minimum interval strategy, or a classifier voting strategy.

In an implementation, the selection unit 300 is further configured for:
  selecting candidate samples from the second unlabeled samples according to the probability; and
  performing the sample reduction on the candidate samples to obtain the third unlabeled sample.

In an implementation, a manner of labeling the third unlabeled sample includes: offline labeling and/or online labeling.

In an implementation, the training unit 400 is further configured for:
  training the machine learning model by using a cross-entropy loss function and a focal loss function.

According to another aspect of an embodiment of the present application, a short message auditing model training apparatus is provided and configured for:
  obtaining a short message auditing model by using the model training apparatus in the above embodiment.

Figure 8:
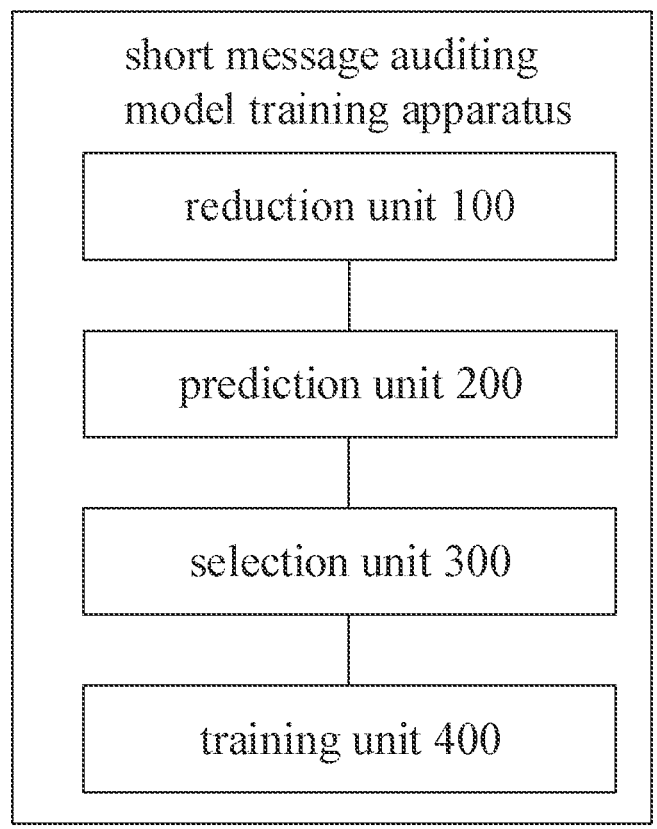
FIG. 8 is a schematic diagram of a short message auditing model training apparatus according to an embodiment of the present application.

FIG. 8 is a schematic diagram of a short message auditing model training apparatus according to an embodiment of the present application. As shown in FIG. 8, the short message auditing model training apparatus includes:
  a reduction unit 100 configured for performing a sample reduction on first unlabeled short message samples to obtain second unlabeled short message samples;
  a prediction unit 200 configured for inputting the second unlabeled short message samples to a short message auditing model for prediction, to obtain a probability corresponding to a result of predicting the second unlabeled short message samples;
  a selection unit 300 configured for selecting a third unlabeled short message sample from the second unlabeled short message samples according to the probability; and
  a training unit 400 configured for training the short message auditing model by using a third unlabeled short message sample after labeling.

Figure 9:
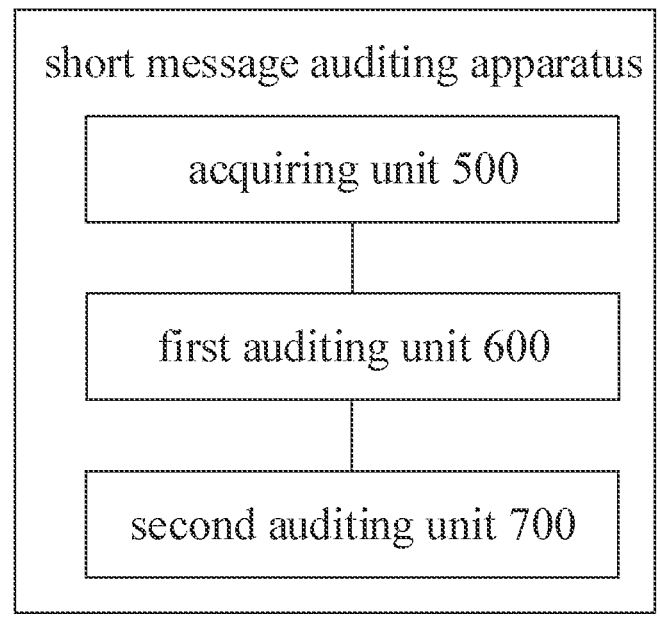
FIG. 9 is a schematic diagram of a short message auditing apparatus according to an embodiment of the present application.

FIG. 9 is a schematic diagram of a short message auditing apparatus according to an embodiment of the present application. As shown in FIG. 9, the short message auditing apparatus includes:
  an acquiring unit 500 configured for acquiring text information of a short message to be audited;
  a first auditing unit 600 configured to for performing, by using a keyword, a preliminary audit on the text information of the short message to be audited; and
  a second auditing unit 700 configured inputting text information of a short message to be audited that passes the preliminary audit to a short message auditing model for prediction, to obtain a result of auditing the text information of the short messages to be audited; the short message auditing model being a model obtained by using the short message auditing model training method in the above embodiment.

The functions of various modules/units in the model training apparatus, the short message auditing model training apparatus, and the short message auditing apparatus in the embodiments of the present application can be referred to the corresponding description in the above-mentioned method, and will not be described in detail herein.

According to an embodiment of the present application, the present application further provides an electronic device and a readable storage medium.

Figure 10:
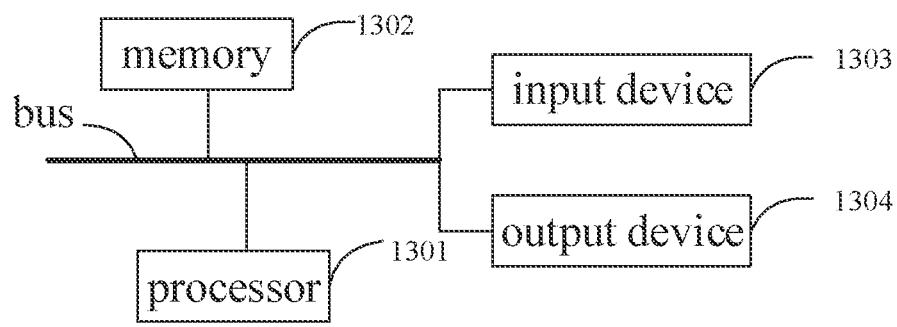
FIG. 10 is a block diagram of an electronic device for implementing a model training method and a short message auditing method in embodiments of the present application.

FIG. 10 is a block diagram of an electronic device for the model training method and the short message auditing method according to an embodiment of the present application. The electronic device is intended to represent various forms of digital computers, such as laptop computers, desktop computers, workstations, personal digital assistants, servers, blade servers, mainframe computers, and other suitable computers. The electronic device can also represent various forms of mobile apparatuses, such as personal digital processing, cellular telephone, smart phone, wearable device, and other similar computing apparatuses. The parts, connections and relationships thereof, and functions thereof shown herein are merely examples and are not intended to limit the implementation of the present application described and/or claimed herein.

As shown in FIG. 10, the electronic device includes: one or more processors 1301, a memory 1402, and interfaces for connecting various parts, including a high-speed interface and a low-speed interface. The various parts are connected to each other using different buses and can be installed on a common motherboard or installed in other ways as needed. The processor can process instructions executed within electronic device, including instructions stored in the memory or on the memory to display graphical information of the GUI on an external input/output device, (such as display device coupled to an interface). In other implementations, a plurality of processors and/or a plurality of buses can be used with a plurality of memories, if desired. Similarly, a plurality of electronic devices can be connected, each device providing a part of necessary operations (e.g., as a server array, a group of blade servers or a multiprocessor system). In FIG. 10, one processor 1301 is taken as an example.

The memory 1302 is a non-transitory computer-readable storage medium provided by the present application. Wherein, the memory stores instructions executable by at least one processor to cause the at least one processor to execute the model training method and the short message auditing method provided by the present application. The non-transitory computer-readable storage medium of the present application stores computer instructions for causing a computer to execute the model training method and the short message auditing method provided by the present application The memory 1302, as a non-transitory computer-readable storage medium, can be used to store non-transitory software programs, non-transitory computer-executable programs, and modules, such as program instructions/modules (for example, the reduction unit 100, the prediction unit 200, the selection unit 300, and the training unit 400 shown in FIG. 7) corresponding to the modeling training method and short message auditing method in the embodiments of the present application. The processor 1301 executes various functional applications and data processing of the server, i.e., implementing the modeling training method and short message auditing method in the above-described method embodiments, by executing non-transient software programs, instructions, and modules stored in the memory 1302.

The memory 1302 can include a storage program area and a storage data area; wherein the storage program area can store an operating system and an application program required by at least one function, and the storage data area can store data or the like created according to the usage of the electronic device for the model training and the short message auditing. In addition, the memory 1302 can include high speed random access memory, and can also include non-transitory memory, such as at least one magnetic disk storage component, a flash memory component, or other non-transitory solid state storage components. In some embodiments, the memory 1302 optionally includes memories set remotely provided relative to the processor 1301, and these remote memories can be connected to the electronic device for the model training and the short message auditing via a network. Instances of the above network include, but are not limited to, the Internet, an intranet, a local area network, a mobile communication network, and combinations thereof.

The electronic device for the model training method and the short message auditing method can further include: an input device 1303 and an output device 1304. The processor 1301, the memory 1302, the input device 1303, and the output device 1304 can be connected through a bus or in other manners. In FIG. 10, the connection through a bus is taken as an example.

The input device 1303, such as a touch screen, a keypad, a mouse, a trackpad, a touchpad, an indication rod, one or more mouse buttons, a trackball, a joystick, etc., can receive input numeric or character information, and generate key signal inputs related to user settings and functional control of the electronic device for the model training and the short message auditing. The output device 1304 can include display device, an auxiliary lighting apparatus (e.g., an LED), a tactile feedback apparatus (e.g., a vibration motor), etc. The display device can include, but is not limited to, a liquid crystal display (LCD), a light emitting diode (LED) display, and a plasma display. In some implementations, the display device can be a touch screen.

Various implementations of the system and technology described herein can be implemented in a digital electronic circuit system, an integrated circuit system, an application specific ASIC (application specific integrated circuit), computer hardware, firmware, software, and/or combination thereof. These various implementations can include: implementing in one or more computer programs, which can be executed and/or interpreted on a programmable system including at least one programmable processor. The programmable processor can be a dedicated or general-purpose programmable processor that can receive data and instructions from a storage system, at least one input device, and at least one output device, and transmit the data and instructions to the storage system, the at least one input device, and the at least one output device.

These computing programs (also referred to as program, software, software applications, or code) include machine instructions of a programmable processor, and these computer programs can be implemented using a high-level process and/or an object-oriented programming language, and/or an assembly/machine language. As used herein, the terms "machine-readable medium" and "computer-readable medium" refer to any computer program product, device, and/or apparatus (e.g., a magnetic disk, an optical disk, a memory, a programmable logic device (PLD)) for providing machine instructions and/or data to the programmable processor, including the machine-readable medium that receives machine instructions as machine-readable signals. The term "machine-readable signal" refers to any signal used to provide machine instructions and/or data to a programmable processor.

In order to provide the interaction with a user, the system and technology described herein can be implemented on a computer that has: a display apparatus (e.g., a CRT (cathode ray tube) or an LCD (liquid crystal display) monitor) for displaying information to the user; and a keyboard and a pointing apparatus (e.g., a mouse or a trackball) through which the user can provide input to the computer. Other types of apparatus can also be used to provide the interaction with a user for example, the feedback provided to the user can be any form of sensory feedback (e.g., visual feedback, auditory feedback, or tactile feedback); and input from the user can be received in any form (including acoustic input, voice input, or tactile input).

The system and technology described herein can be implemented in a computing system (e.g., as a data server) that includes a background part, or be implemented in a computing system (e.g., an application server) that includes a middleware part, or be implemented in a computing system (e.g., a user computer having a graphical user interface or a web browser, through which a user can interact with implementations of the system and technology described herein) that includes a front-end part, or be implemented in a computing system that includes any combination of such background part, middleware part, or front-end part. The parts of the system can be interconnected by any form or medium of the digital data communication (e.g., a communication network). Examples of the communication network include: a Local Area Networks (LAN), a Wide Area Network (WAN), and the Internet.

A computer system can include a client and a server. The client and server are typically remote from each other and typically interact through a communication network. The relationship of the client and the server is generated by computer programs running on respective computers and having a client-server relationship with each other. The server can be a cloud server, also called a cloud computing server or a cloud host, which is a host product in a cloud computing service system, to solve the defects of high management difficulty and weak business expansibility in a traditional physical host and a virtual private server (VPS) service. The server can also be a server of a distributed system, or a server incorporating a chain of blocks.

According to the technical solutions in the embodiments of the present application, through a sample reduction, the selected samples have a certain degree of representativeness, and a machine learning model is used to further select an informative sample with the most labeling significance for the current model by using an active learning technology, reducing the cost of labeling.

It should be understood that various forms of processes shown above can be used to reorder, add, or delete steps. For example, respective steps recorded in the present application can be executed in parallel, or can be executed sequentially, or can be executed in a different order, so long as the desired result of the technical solution disclosed in the present application can be achieved, no limitation is made herein.

The above-mentioned specific implementations do not constitute a limitation on the protection scope of the present application. It should be understood by those skilled in the art that various modifications, combinations, sub-combinations and substitutions can be made according to design requirements and other factors. Any modification, equivalent replacement and improvement, and the like made within the spirit and principle of the present application shall be included within the protection scope of the present application.

What is claimed is:

1. A model training method, wherein the method is applied to a short message auditing service and executed by an electronic device, wherein the electronic device comprises a processor and a memory storing instructions, the processor, by executing the instructions, implements the following operations comprising:
    performing a sample reduction on first unlabeled samples to obtain second unlabeled samples, wherein the first unlabeled samples are unlabeled message data regularly captured from logs of a short message production system or unlabeled messages that cannot be manually recognized, captured from a short message consulting group;
    inputting the second unlabeled samples to a machine learning model for prediction, to obtain a probability corresponding to a result of predicting the second unlabeled samples;
    selecting a third unlabeled sample from the second unlabeled samples according to the probability; and
    training the machine learning model by using a third unlabeled sample after labeling, to perform iteration and optimization on the machine learning model;
    wherein, selecting the third unlabeled sample from the second unlabeled samples according to the probability, further comprises:
    substituting the probability corresponding to the result of predicting the second unlabeled samples into a preset selection strategy, to selecting candidate samples from the second unlabeled samples through calculation; and
    performing the sample reduction on the candidate samples to obtain the third unlabeled sample;
    wherein, performing the sample reduction on the first unlabeled samples to obtain the second unlabeled samples comprises:
    replacing designated characters in the first unlabeled samples;
    slicing historical samples into multiple sample segments;
    calculating similarities between each of the replaced first unlabeled samples and the multiple sample segments;
    performing the sample reduction according to the similarities between each of the replaced first unlabeled samples and the multiple sample segments.

2. The method of claim 1, wherein performing the sample reduction on the first unlabeled samples to obtain the second unlabeled samples, comprises:
    calculating similarities between samples; the similarities between samples comprising similarities between every two first unlabeled samples and/or similarities between each of the first unlabeled samples and a historical sample; and
    performing the sample reduction according to the similarities between samples.

3. The method of claim 2, wherein selecting the third unlabeled sample from the second unlabeled samples according to the probability, comprises:
    performing calculation by using a preset selection strategy to obtain the third unlabeled sample; the selection strategy comprising at least one of a maximum entropy strategy, a minimum confidence strategy, a minimum interval strategy, or a classifier voting strategy.

4. The method of claim 2, wherein a manner of labeling the third unlabeled sample comprises: offline labeling and/or online labeling.

5. The method of claim 1, wherein selecting the third unlabeled sample from the second unlabeled samples according to the probability, comprises:
    performing calculation by using a preset selection strategy to obtain the third unlabeled sample; the selection strategy comprising at least one of a maximum entropy strategy, a minimum confidence strategy, a minimum interval strategy, or a classifier voting strategy.

6. The method of claim 1, wherein a manner of labeling the third unlabeled sample comprises: offline labeling and/or online labeling.

7. The method of claim 1, wherein the method further comprises:
training the machine learning model by using a cross-entropy loss function and a focal loss function.

8. A short message auditing model training method, comprising:
obtaining a short message auditing model by using the model training method of claim 1.

9. A short message auditing method, comprising:
acquiring text information of a short message to be audited;
performing, by using a keyword, a preliminary audit on the text information of the short message to be audited; and
inputting text information of a short message to be audited that passes the preliminary audit to a short message auditing model for prediction, to obtain a result of auditing the text information of the short messages to be audited; the short message auditing model being a model obtained by using the short message auditing model training method of claim 8.

10. An electronic device, comprising:
at least one processor; and
a memory communicatively connected to the at least one processor, wherein the memory stores instructions that can be executed by the at least one processor, and the instructions are executed by the at least one processor to enable the at least one processor to:
perform a sample reduction on first unlabeled samples to obtain second unlabeled samples, wherein the first unlabeled samples are unlabeled message data regularly captured from logs of a short message production system or unlabeled messages that cannot be manually recognized, captured from a short message consulting group;
input the second unlabeled samples to a machine learning model for prediction, to obtain a probability corresponding to a result of predicting the second unlabeled samples;
select a third unlabeled sample from the second unlabeled samples according to the probability; and
train the machine learning model by using a third unlabeled sample after labeling, to perform iteration and optimization on the machine learning model;
wherein, the instructions are executed by the at least one processor to further enable the at least one processor to:
substitute the probability corresponding to the result of predicting the second unlabeled samples into a preset selection strategy, to select candidate samples from the second unlabeled samples through calculation; and
perform the sample reduction on the candidate samples to obtain the third unlabeled sample;
wherein, the instructions are executed by the at least one processor to further enable the at least one processor to:
replace designated characters in the first unlabeled samples;
slice historical samples into multiple sample segments;
calculate similarities between each of the replaced first unlabeled samples and the multiple sample segments;
perform the sample reduction according to the similarities between each of the replaced first unlabeled samples and the multiple sample segments.

11. The electronic device of claim 10, wherein the instructions are executed by the at least one processor to further enable the at least one processor to:
calculate similarities between samples; the similarities between samples comprising similarities between every two first unlabeled samples and/or similarities between each of the first unlabeled samples and a historical sample; and
perform the sample reduction according to the similarities between samples.

12. The electronic device of claim 10, wherein the instructions are executed by the at least one processor to further enable the at least one processor to:
perform calculation by using a preset selection strategy to obtain the third unlabeled sample; the selection strategy comprising at least one of a maximum entropy strategy, a minimum confidence strategy, a minimum interval strategy, or a classifier voting strategy.

13. The electronic device of claim 10, wherein a manner of labeling the third unlabeled sample comprises: offline labeling and/or online labeling.

14. The electronic device of claim 10, wherein the instructions are executed by the at least one processor to further enable the at least one processor to:
train the machine learning model by using a cross-entropy loss function and a focal loss function.

15. The electronic device of claim 10, wherein the instructions are executed by the at least one processor to further enable the at least one processor to:
obtain a short message auditing model by:
performing the sample reduction on the first unlabeled samples to obtain the second unlabeled samples;
inputting the second unlabeled samples to the machine learning model for prediction, to obtain the probability corresponding to the result of predicting the second unlabeled samples;
selecting the third unlabeled sample from the second unlabeled samples according to the probability; and
training the machine learning model by using the third unlabeled sample after labeling.

16. The electronic device of claim 10, wherein the instructions are executed by the at least one processor to further enable the at least one processor to:
acquire text information of a short message to be audited;
perform, by using a keyword, a preliminary audit on the text information of the short message to be audited; and
input text information of a short message to be audited that passes the preliminary audit to a short message auditing model for prediction, to obtain a result of auditing the text information of the short messages to be audited; the short message auditing model is a model obtained by:
performing the sample reduction on the first unlabeled samples to obtain the second unlabeled samples;
inputting the second unlabeled samples to the machine learning model for prediction, to obtain the probability corresponding to the result of predicting the second unlabeled samples;
selecting the third unlabeled sample from the second unlabeled samples according to the probability; and
training the machine learning model by using the third unlabeled sample after labeling.

17. A non-transitory computer-readable storage medium storing computer instructions, wherein the computer instructions are used to cause a computer to:
perform a sample reduction on first unlabeled samples to obtain second unlabeled samples, wherein the first unlabeled samples are unlabeled message data regularly captured from logs of a short message production system or unlabeled messages that cannot be manually recognized, captured from a short message consulting group;

input the second unlabeled samples to a machine learning model for prediction, to obtain a probability corresponding to a result of predicting the second unlabeled samples;

select a third unlabeled sample from the second unlabeled samples according to the probability; and train the machine learning model by using a third unlabeled sample after labeling, to perform iteration and optimization on the machine learning model;

wherein, the computer instructions are used to cause a computer to:

substitute the probability corresponding to the result of predicting the second unlabeled samples into a preset selection strategy, to select candidate samples from the second unlabeled samples through calculation; and perform the sample reduction on the candidate samples to obtain the third unlabeled sample;

wherein, the computer instructions are used to cause a computer to:

replace designated characters in the first unlabeled samples;

slice historical samples into multiple sample segments;

calculate similarities between each of the replaced first unlabeled samples and the multiple sample segments;

perform the sample reduction according to the similarities between each of the replaced first unlabeled samples and the multiple sample segments.

* * * * *